UNITED STATES PATENT OFFICE.

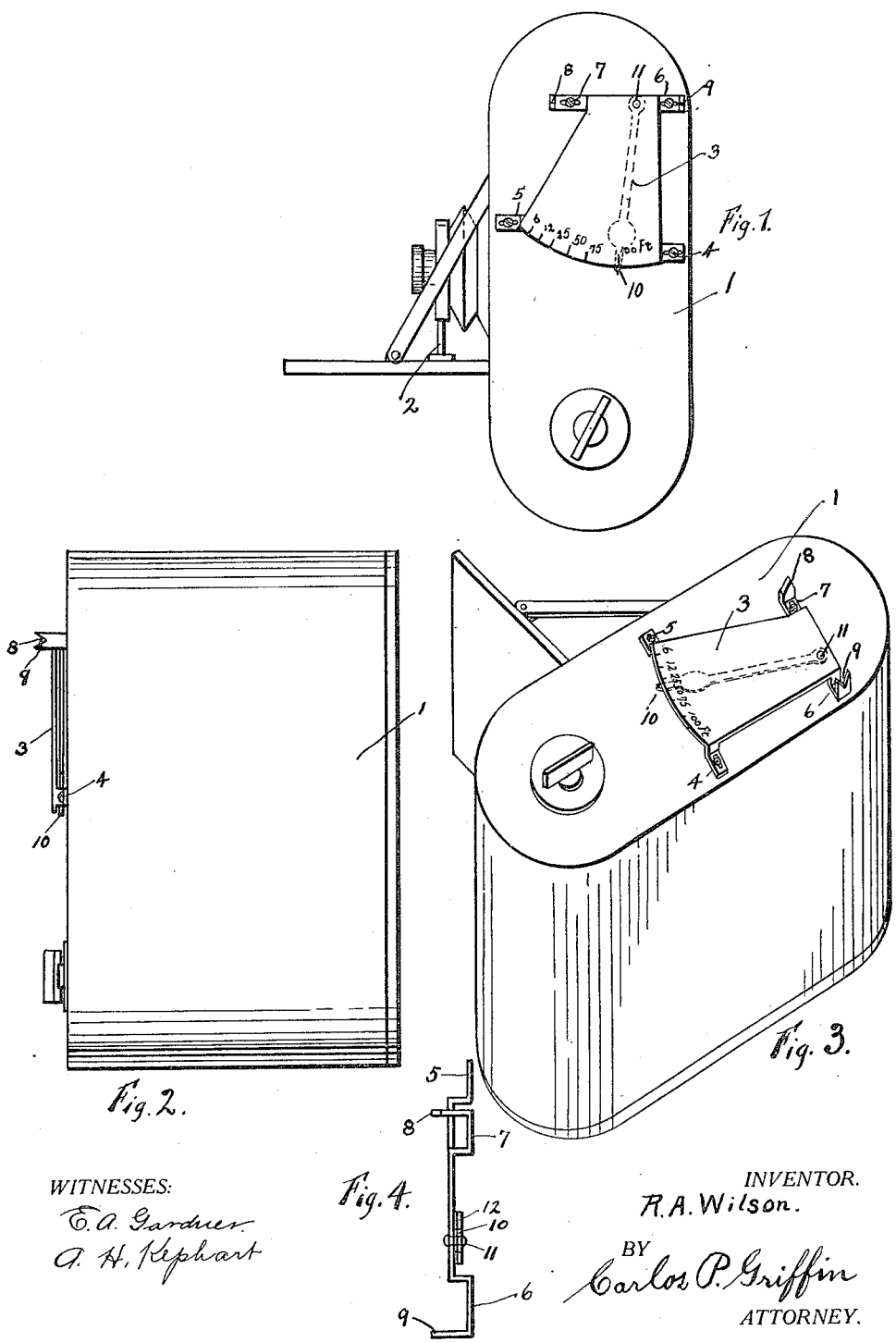

RADCLIFF A. WILSON, OF SAN FRANCISCO, CALIFORNIA.

DISTANCE-MEASURING DEVICE.

1,144,675. Specification of Letters Patent. Patented June 29, 1915.

Application filed June 8, 1914. Serial No. 843,687.

*To all whom it may concern:*

Be it known that I, RADCLIFF A. WILSON, a citizen of the United States, residing at San Francisco, in the county of San Francisco, State of California, have invented a new and useful Distance-Measuring Device, of which the following is a specification, in such full and clear terms as will enable those skilled in the art to construct and use the same.

This invention relates to a device for determining the distance of an object from the observer to enable camera users to accurately focus upon the object to be photographed thereby producing better pictures than would be the case if the proper focus is not obtained.

An embodiment of the invention is shown in the drawing in which the same reference numeral is applied to the same portion throughout, but I am aware that there are many modifications thereof.

Figure 1 is a side elevation of a camera having this device applied thereto, Fig. 2 is an edge elevation of the camera and the device as it appears to the observer in taking a sight, Fig. 3 is a perspective view of the camera and distance finder indicating the way the camera is turned over to examine the sight after taking the same, and Fig. 4 is a plan view of the device separate from the camera.

The numeral 1 represents the camera box, 2 indicating an adjusting device for setting the lens to the proper focus.

The sighting device comprises a sector plate 3 having projecting brackets 4 and 5 at the bottom for securing the device to the camera box. At the top the plate 3 has two brackets 6 and 7 for securing the upper end of the device to the box 1, and also for providing a sight 8 and notch 9, through which latter the object to be photographed is to be observed. The plate 3 is held away from the camera box slightly more than the thickness of the pendulum 10, which latter is pivoted to the plate 3 at 11 and which has a weight 12 at its lower end. The lower end of the pendulum projects out from under the plate 3 far enough to enable the operator to observe the position thereof when desired, the outside of the plate having the marks 6—12—15—25—50—100, etc., thereon to indicate the distance. It will be observed that the three holes in the brackets 6, 7 and 4 are on lines at right angles to each other, the object of which is to enable the user to correctly install the device on the camera.

In use the person using the camera holds the sight one foot from his eye and sights at a point as nearly as possible on a level with his feet, at the base of the object, the average height of persons giving a base line for the determination of the measurement. When the sight has been made the camera is carefully turned over on its side as in Fig. 3 and the pendulum will be set at the proper distance mark, whereupon the camera may be set to the proper focus in the usual way.

Having thus described my invention what I claim as new and desire to secure by Letters Patent of the United States, is as follows, modifications within the scope of the claim being expressly reserved:

A distance measuring device for cameras comprising a plate provided with a distance scale, brackets for securing said plate to the side of a camera, sights carried by two of said brackets, and a pendulum pivoted to the plate and having one end movable across said distance scale.

In testimony whereof I have hereunto set my hand this 29th day of May A. D. 1914, in the presence of the two subscribed witnesses.

RADCLIFF A. WILSON.

Witnesses:
C. P. GRIFFIN,
HENRY B. LISTER.

Copies of this patent may be obtained for five cents each, by addressing the "Commissioner of Patents, Washington, D. C."